United States Patent [19]
Czerwiec

[11] Patent Number: 5,903,372
[45] Date of Patent: May 11, 1999

[54] MEANS FOR REMOTE ADDITION OF VIDEO SERVICES TO SUBSCRIBERS

[75] Inventor: Richard M. Czerwiec, Raleigh, N.C.

[73] Assignee: Alcatel Network Systems, Inc., Richardson, Tex.

[21] Appl. No.: 08/797,115

[22] Filed: Feb. 10, 1997

[51] Int. Cl.[6] .............................. H04J 14/02; H04B 10/00
[52] U.S. Cl. .............................. 359/125; 359/167; 348/6; 348/12; 455/3-1; 340/825.79
[58] Field of Search ..................................... 359/109, 125, 359/128, 137, 139, 157, 167; 348/6, 12–13; 455/6.1, 6.2, 6.3, 3.1; 340/825.79; 370/487

[56] References Cited

U.S. PATENT DOCUMENTS

| | | | |
|---|---|---|---|
| 3,917,904 | 11/1975 | Macrander et al. | 179/2 |
| 4,833,708 | 5/1989 | Goodrich | 379/327 |
| 5,150,357 | 9/1992 | Hopner et al. | 370/68.1 |
| 5,181,106 | 1/1993 | Sutherland | 358/86 |
| 5,198,808 | 3/1993 | Kudo | 340/825.8 |
| 5,200,989 | 4/1993 | Milone | 379/53 |
| 5,283,678 | 2/1994 | Czerwiec | 359/109 |
| 5,303,229 | 4/1994 | Withers et al. | 370/58.1 |
| 5,410,343 | 4/1995 | Coddington et al. | 348/7 |
| 5,432,505 | 7/1995 | Wise | 340/825.06 |
| 5,440,554 | 8/1995 | Stannard et al. | 370/60.1 |
| 5,455,856 | 10/1995 | Story | 379/327 |
| 5,500,753 | 3/1996 | Sutherland | 359/125 |
| 5,512,936 | 4/1996 | Burton et al. | 348/11 |
| 5,515,037 | 5/1996 | Wise | 340/825.79 |
| 5,528,283 | 6/1996 | Burton | 348/13 |
| 5,541,586 | 7/1996 | Wise | 340/825.79 |
| 5,719,872 | 2/1998 | Dubberly et al. | 370/487 |

FOREIGN PATENT DOCUMENTS 0076362  4/1983  European Pat. Off. .

*Primary Examiner*—Kinfe-Michael Negash
*Attorney, Agent, or Firm*—Ware, Fressola, Van Der Sluys & Adolphson LLP

[57] ABSTRACT

The present invention details an apparatus for distribution of video and telephony services on a single twisted wire pair to each of a plurality of subscribers, comprising an optical network unit (ONU) connected by means of an optical fiber to a remote terminal, the ONU for installation in a neighborhood of primary and secondary subscribers. The ONU includes a switch matrix card for installation in the ONU for connection to POTS cards for a first number of primary subscribers over a corresponding first number of single twisted wire pairs and also for switched connection to a second number of switchable video cards, the first number being greater than the second number, the switch matrix card for connecting one or more of the switchable video cards to corresponding POTS cards resulting in an overlay of the video services and the telephony services using a VDSL technique, the overlay for remote selection over the fiber from the remote terminal whereby dispatch of a service person to connect or disconnect video services is avoided.

6 Claims, 5 Drawing Sheets

MEANS FOR REMOTE ADDITION OF VIDEO SERVICES TO SUBSCRIBERS

TECHNICAL FIELD

1. Field of the Invention

The present invention relates to providing both video and telephony services to subscribers, and more particularly, to remotely providing video service to subscribers.

2. Background of the Invention

An optical network unit (ONU) is installed in a neighborhood of subscribers for distribution of video and telephony services to homes of subscribers. The optical network unit is connected by means of an optical fiber to a remote terminal which is in turn connected by similar fibers to a large plurality of ONU's.

Similarly, a large plurality of remote terminals is in turn connected by corresponding optical fibers to a central office.

In the past, telephony services have been delivered to the homes of subscribers by means of traditional "plain old telephone service (POTS)" twisted wire pairs, one pair per subscriber from the ONU. Video services were carried by coax cables from the ONU.

It is now possible over short distances of about 300 meters to provide both video and telephony services overlaid on the same POTS twisted pair using a technology called VDSL.

VDSL technology, as well as ADSL technology, uses a mechanism called Discrete Multi-Tone Technology (DMT) in which the bandwidth above normal telephony audio (0–4 KHz) is utilized to deliver high speed data (video service). This technology is defined in ANSI Document T1.413 and consists of splitting the bandwidth above 4 KHz into an upstream data spectrum and a downstream data spectrum. Data is transmitted as multiple tones with a 4.3 KHz spacing between successive tones. Due to the frequency characteristics of twisted wire pairs (copper), VDSL technology is sensitive to interference caused by distance and noise. ADSL technology (DMT based) permits transmission of data at downstream rates in the order of 6 MBS at distances in the order of 3,700 meters, whereas VDSL (DMT based) permits transmission of data at 25 MBS over approximately 300 meters. The resulting signals at both ends of the twisted wire pair (copper) are subjected to low pass and high pass filters, allowing telephony and data (video) paths to be split and overlaid, as appropriate.

In a pure telephony application, Sutherland (U.S. Pat. No. 5,500,753) showed a way to provide an optical network unit with a cross-connected matrix to allow remote control of the cross-connected matrix from a central office to connect selected line connectors to selected drop connectors and thereby electrically connect the ONU to the plurality of user sites remotely.

As is known in the art of cable television, it is often necessary to frequently dispatch servicemen to hook up or disconnect cable television subscribers. This is a particularly expensive proposition because of the time consuming nature of the work and, in addition, because of the high "churn" rates of subscribers for such services. Therefore, it would be desirable to be able to add video services remotely without dispatching personnel to the ONU.

This could be accomplished with a large matrix array with telephony and video ports being connected to the subscriber drop, but the cost per line of such an array would be prohibitive. However, a knowledge of service usage and expected service "take" rates (i.e., the rate of change in percentage of users which are expected to desire video service as well as telephony service) permits the far more expedient matrix of the present invention to provide the electronic connections desired.

DISCLOSURE OF INVENTION

It is, therefore, an object of the present invention to provide a way to add and remove video services remotely without dispatching personnel to the ONU.

According to the present invention an apparatus for distribution of video and telephony services on a single twisted wire pair to each of a plurality of subscribers, includes an optical network unit (ONU) connected by means of an optical fiber to a remote terminal. The ONU is adapted for installation in a neighborhood of primary and secondary subscribers, and includes a switch matrix card for installation in the ONU for connection to telephony service (POTS) cards for a first number of primary subscribers over a corresponding first number of single twisted wire pairs and also for switched connection to a second number of switchable video cards. The first number of primary subscribers being greater than the second number of switchable video cards. The switch matrix card connects one or more of the switchable video cards to corresponding POTS cards resulting in an overlay of the video services and the telephony services which is selected remotely over the fiber from the remote terminal whereby dispatch of a service person to connect or disconnect video services is avoided. The ONU may consist of POTS cards, hard-wired video cards, switchable video cards, dedicated video cards and the switch matrix card. The switch matrix card may consist of a plurality of relays interconnected in such a way as to allow any POTS card to be connected with any switchable video card, whereby video service is overlaid on the telephony service already provided.

In further accord with the present invention the ONU is installed with a connection board to which twisted wire pairs corresponding to the first number of primary subscribers are first connected before connection to the switch matrix within the connection board in order to provide service access outside the ONU enabling the service person to subsequently convert a use of the switchable video cards for providing the video services to the primary subscribers to a use of hard-wired video cards for providing the video services to the primary subscribers without necessarily disturbing the ONU. Thus, the switchable video cards may be reused to supply video services to other primary subscribers through the switch matrix card, once external "hard-wiring" of overlaid video services is accomplished.

In still further accord with the present invention the connection board may be connected to twisted wire pairs corresponding to secondary subscribers, so that the secondary subscribers may be provided with both the video services from dedicated video cards and the telephony services from the POTS cards. Secondary subscribers typically comprise secondary lines to primary subscribers.

Still further in accord with the present invention the connection board may be connected to the hard-wired video cards thereby enabling the service person to subsequently convert a use of the switchable video cards for providing the video services to the primary subscribers to a use of hard-wired video cards for providing the video services to the primary subscribers without necessarily disturbing the ONU. Thus, the switchable video card may then be reused to supply video services to future primary subscribers desiring video through the switch matrix card (i.e., by removing primary subscribers receiving both video and telephony services from the switch matrix card via hard-wiring, the resources of the switch matrix are released, thus enabling video service to be added remotely in the future).

The present invention uses one of a number of slots of a distribution shelf in an ONU to insert a switch matrix card to which both POTS cards and switchable video cards are connected. The switch matrix card could be a plurality of relays interconnected in such a way as to allow an output of any POTS card to be connected through any switchable video card, whereby video services are overlaid on telephony services. Primary subscribers are routed through the switch matrix card and initially subscribe only to telephony service. The primary subscribers may later decide to subscribe to video services as well. When the primary subscribers decide to add video services the switch matrix card permits a remote connection of POTS card being used to supply the primary subscriber with telephony services with a switchable video card not already used by another primary subscriber who desired video services as well. Thus, dispatch of a service person is avoided along with a reduction in cost.

The connection board can be located in a separate box and provides access to both telephony and video services through terminals which may be selectively connected. The connection board permits connection of secondary subscribers who initially desire both video services and telephony services at the outset to the output of dedicated video cards which are hard-wired to POTS cards within the ONU. The connection board also permits the connection of a primary subscriber who has decided to receive both video services and telephony services to a hard-wired video card thereby removing the necessity for the primary subscriber to use the limited resources of the switch matrix card thereby releasing these resources to other primary subscribers who may desire both video services and telephony service. The switch matrix card may also be removed entirely and reused elsewhere if each of the primary subscribers releases use of the switch matrix card via a hard-wire connection to the hard-wired video card described above.

Thus, the present invention permits (1) addition or removal of video service via the matrix, (2) conversion of a matrix-added video service to a hard-wired video service without disturbing the ONU, i.e., using the connection box, (3) allowing the problem of subscriber "churn" to be handled remotely and (4) remote repair, e.g., replacement of a "dead" video card by remote removal via the matrix and replacement with an idle card without the need to dispatch a service person.

These and other objects and advantages of the present invention will become apparent from a consideration of the ensuing drawings and description.

Figure 1:
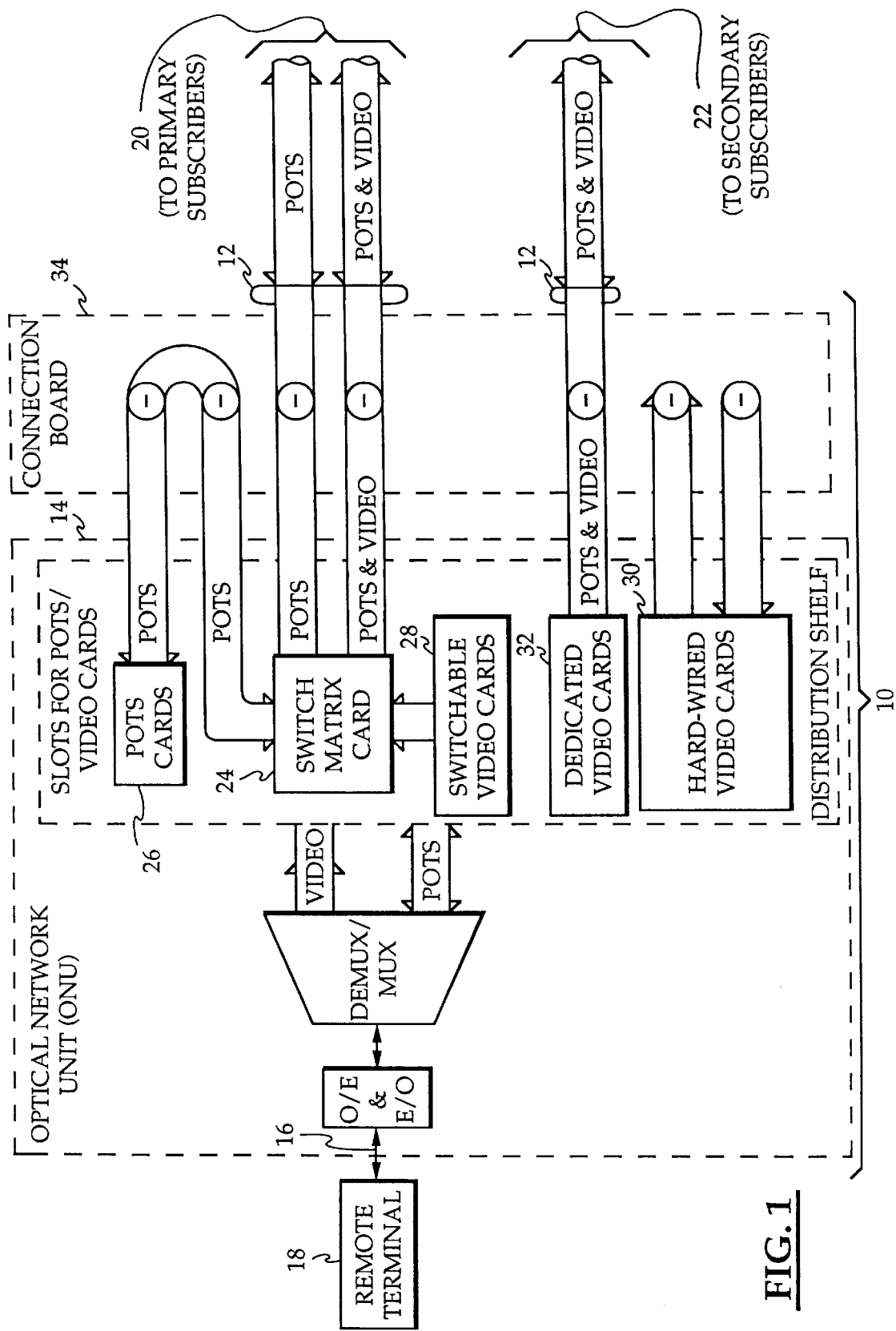
FIG. 1 shows a block diagram of an ONU employing a switch matrix card and connection board of the present invention.

REFERENCE NUMERALS IN THE DRAWINGS 10 means for remote addition of video services
12 twisted wire pair
14 ONU
16 optical fiber
18 remote terminal
20 primary subscriber
22 secondary subscriber
24 switch matrix card
26 POTS card
28 switchable video card
30 hard-wired video card
32 dedicated video card
34 connection board
36 video port
38 crosspoint
40 primary subscriber #4
42 primary subscriber #3
44 jumper

MODE FOR CARRYING OUT THE INVENTION

FIG. 1 shows means 10 for remote addition of video services according to the present invention for distribution of video and telephony services on a single twisted wire pair 12 to each of a plurality of subscribers at different premises in a neighborhood. An optical network unit (ONU) 14 is connected by means of an optical fiber 16 to a remote terminal 18, the ONU 14 being adapted for installation in the neighborhood for primary subscribers 20 and secondary subscribers 22. The ONU 14 includes a switch matrix card 24 for installation therein along with a plurality of POTS cards 26 for a first number of primary subscribers 20 for providing telephony services over a corresponding first number of single twisted wire pairs 12. The switch matrix is connected to a second number of switchable video cards 28 for switched connection thereto, the first number being greater than the second number. The switch matrix card 24 connects one or more of the switchable video cards 28 to corresponding POTS cards 26 resulting in an overlay of video services and telephony services. The switchable video cards 28 are selected remotely over the optical fiber 16 from the remote terminal 18 whereby dispatch of a service person to connect, disconnect or repair video services is avoided.

The ONU 14 may also include hard-wired video cards 30 and dedicated video cards 32. The switch matrix card 24 may include a plurality of relays interconnected in such a way as to allow any POTS card 26 to be connected with any switchable video card 28 as someone skilled in the art will appreciate.

Figure 2:
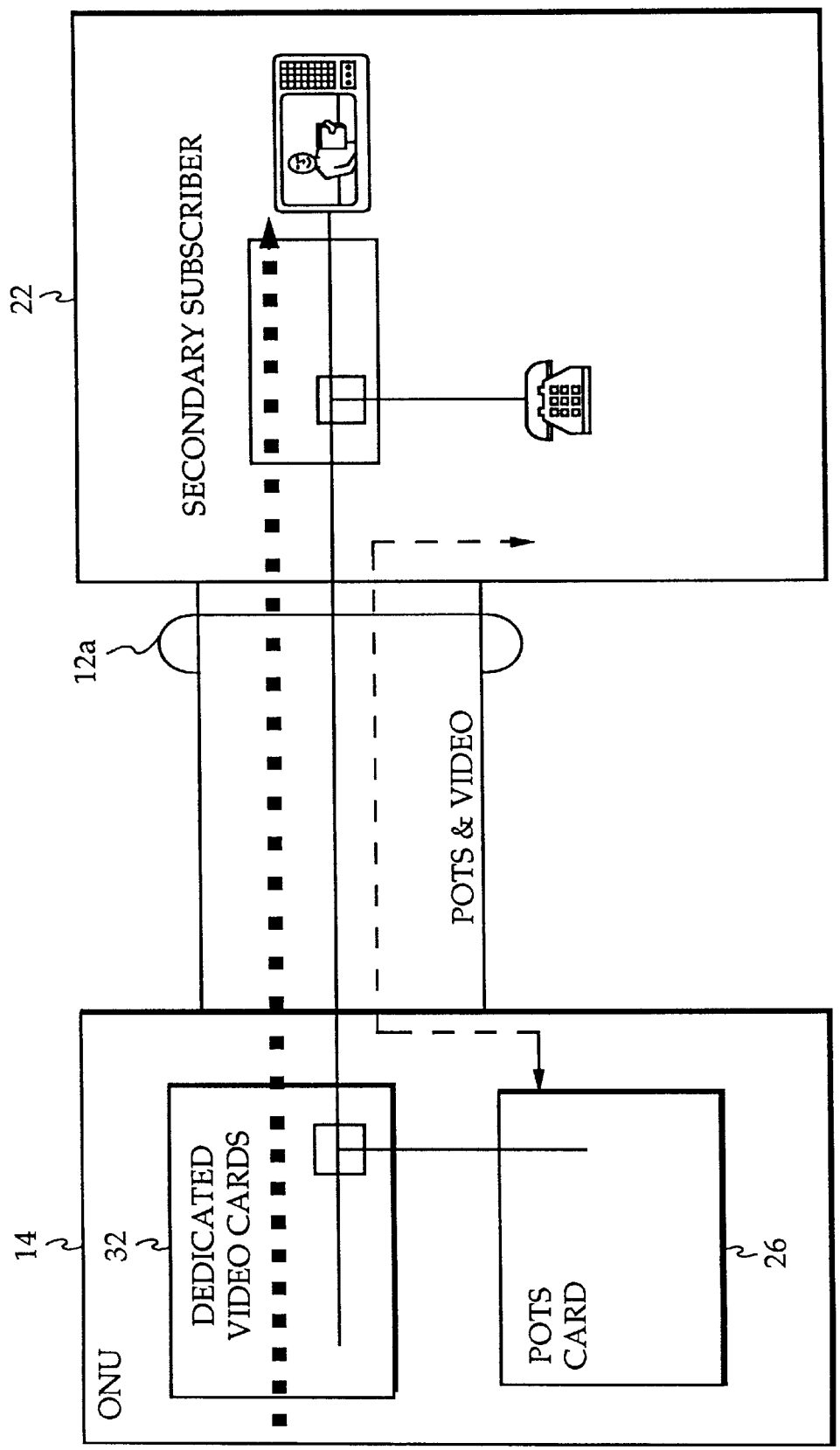
FIG. 2 shows a typical overlay of video services and telephony services accomplished by the VDSL technique.

Referring to FIG. 2 the overlay of video and telephony services over the same twisted wire pair 12a is shown. FIG. 2 depicts a secondary subscriber 22 being supplied with video and telephony services through a single twisted wire pair 12a which is derived from the dedicated video cards 32 and the POTS cards 26. The concept of overlaying video and telephony services applies to primary subscribers 20 as well, except that the primary subscribers 20 have video and telephony services routed through the switch matrix card 24.

Referring back to FIG. 1, the ONU 14 may be installed with a connection board 34 to which twisted wire pairs 12 corresponding to the first number of primary subscribers 20 are first connected before connection to the switch matrix card 24 within the ONU 14 in order to provide access outside the ONU 14. This enables the service person to subsequently convert the primary subscribers 20 formerly connected to video services by means of a switchable video card or cards 28 to a connection by means of hard-wired video cards 30 for providing hard-wired video services to the primary subscribers 20 without necessarily disturbing the ONU 14, whereby the switchable video card or cards 28 may then be subsequently reused to supply the video services to other primary subscribers 20 remotely through the switch matrix card 24.

The connection board 34 may be connected to twisted wire pairs 12 corresponding to secondary subscribers 22, whereby the secondary subscribers 22 may be provided with both video services from dedicated video cards 32 and telephony services from the POTS cards 26.

As suggested above, the connection board 34 may be connected to the hard-wired video cards 30 to enable the service person to subsequently convert a subscriber from a use of a switchable video card 28 to a use of one of the hard-wired video cards 30 for providing video services to one of the subscribers without necessarily disturbing the ONU 14, whereby the switchable video card 28 may then be reused to supply video services to another subscriber through the switch matrix card 24.

Figure 4:
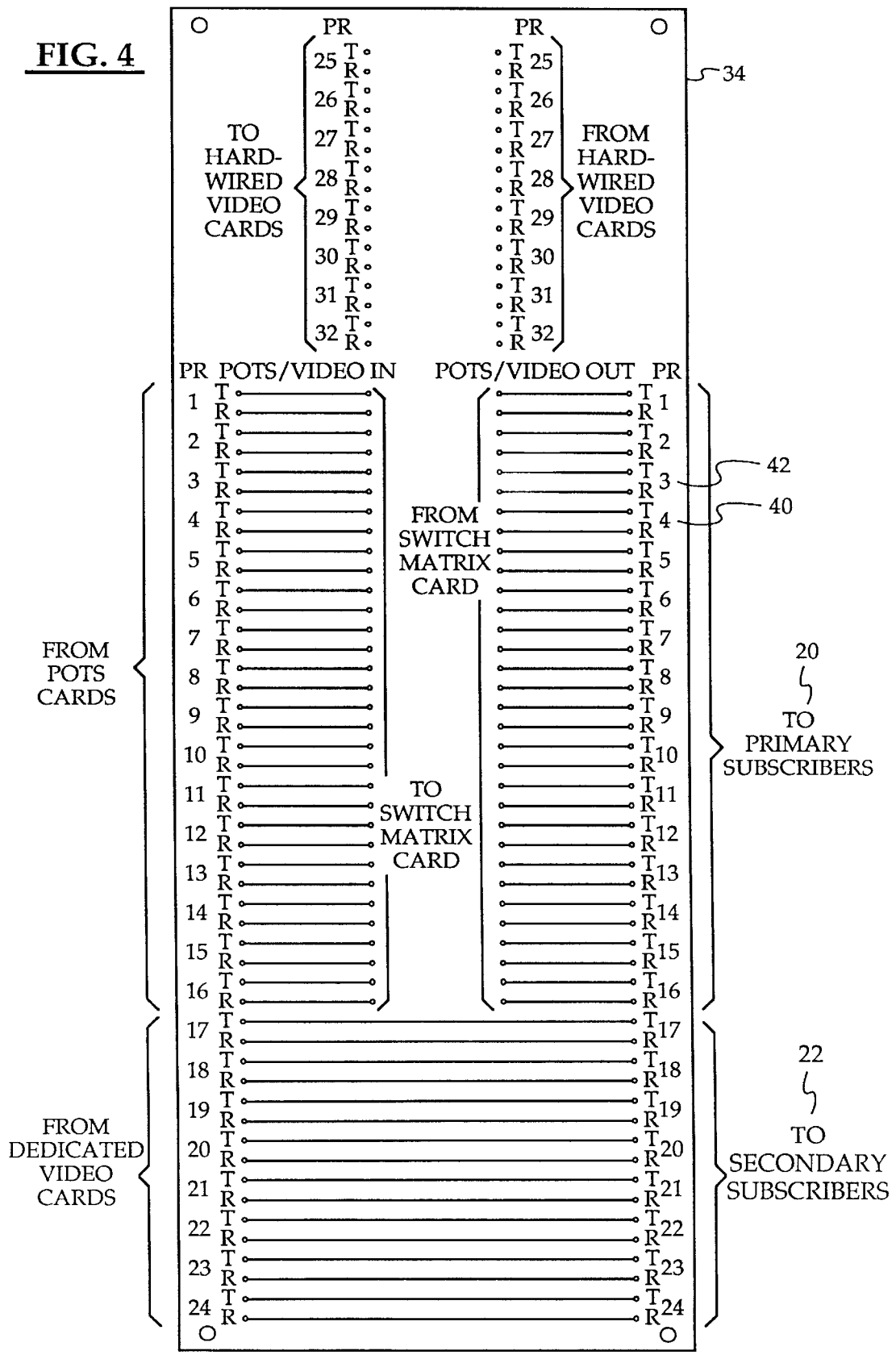
FIG. 4 shows detail of the connection board with primary subscriber #4 wired through the switch matrix card.
Figure 5:
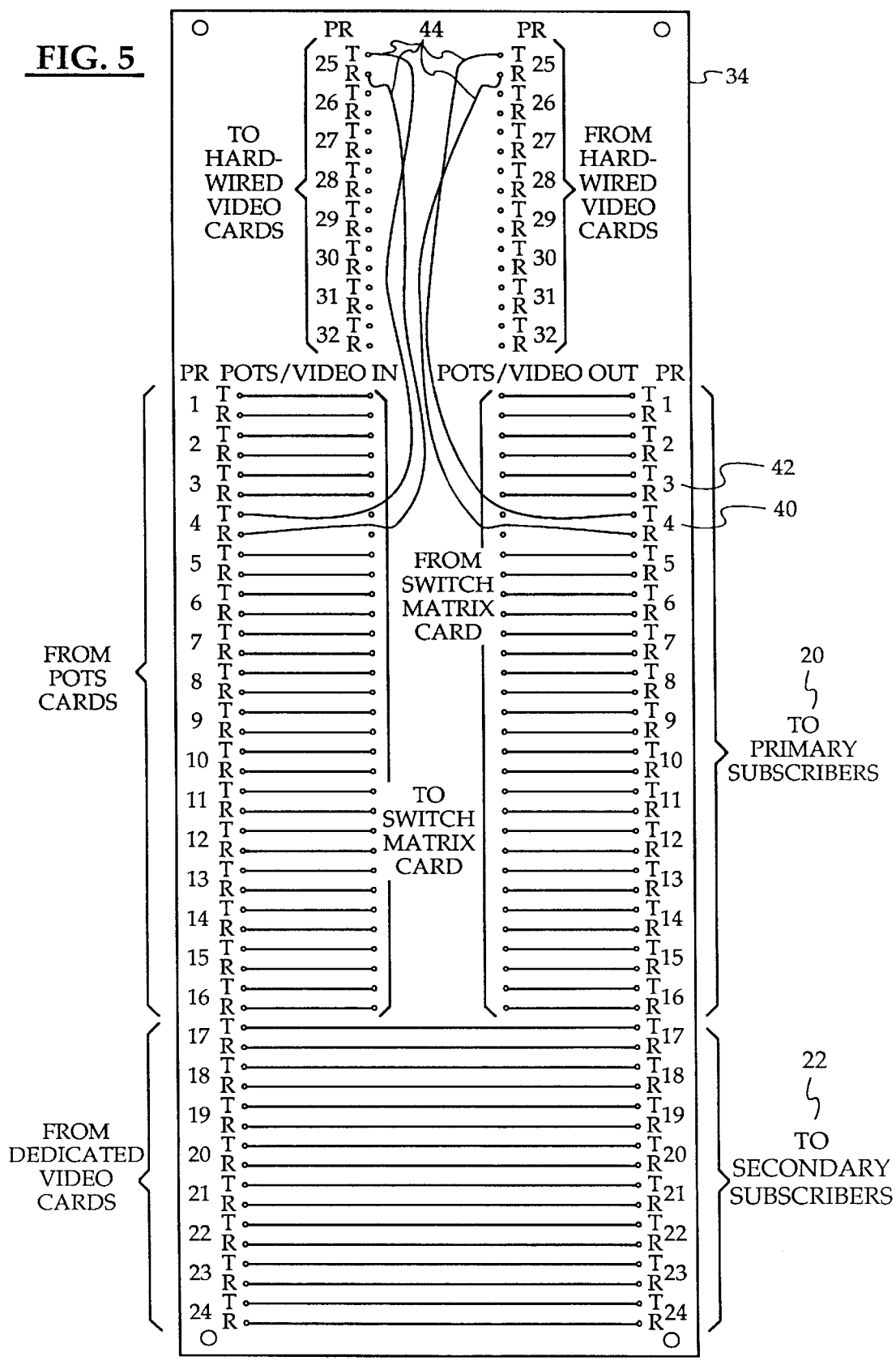
FIG. 5 shows detail of the connection board with primary subscriber #4 bypassing the switch matrix card (i.e., hard-wired video overlay service).

As an example, a typical ONU 14 could provide services to a maximum of 16 primary subscribers 20 and 8 secondary subscribers 22 as shown in FIGS. 4 and 5. Video service "take" rates to primary subscribers 20 are assumed to be no more than 50% (i.e., 8 primary subscribers 20 who desire both video and telephony services). It is further assumed that video services subsequent to initial installation will primarily be provided to primary subscribers 20 since video services to secondary subscribers 22 is provided upon initial installation (or installed at a premium).

Figure 3:
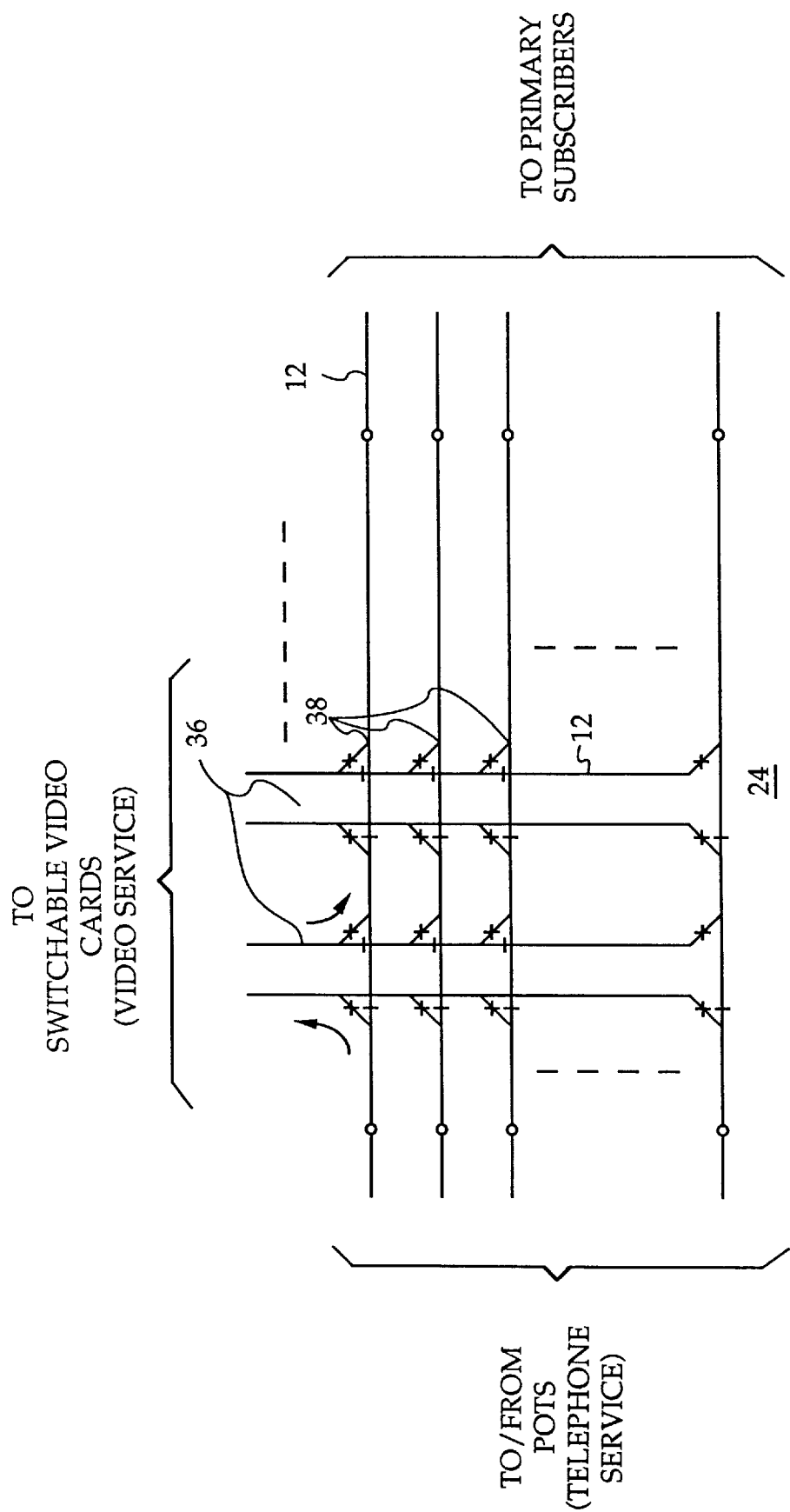
FIG. 3 shows a layout of a switch matrix card with 2 video ports and 16 telephony services (2×16).

As shown, the ONU 14 contains switchable video cards 28, hard-wired video cards 30, dedicated video cards 32, POTS cards 26, and the switch matrix card 24 as shown on FIG. 1. A layout of a typical switch matrix card 24 is shown in FIG. 3 as supplying 2 video ports 36. However, this should not be construed as a limitation. In fact an optimal number of video ports 36 is a function of a number of variables including:

1. rate of growth of video services in a predetermined area;
2. amount an operating company is willing to spend on idle video cards; and
3. cost of dispatching service personnel.

The switch matrix card 24 can be provided in different configurations (or not provided at all) depending on the service area. For instance, rapidly expanding areas may require a switch matrix card 24 with 4 video ports 36, while a more slowly expanding area may only require a switch matrix card 24 with 1 or 2 video ports 36. The only difference between the configurations of the switch matrix card 24 is component population.

At each juncture of vertical video service lines and POTS lines are shown four contacts of a relay associated with that juncture. Two are normally closed (symbolized by a straight line) and two are normally open (symbolized by an X).

VIDEO SERVICE ADDITIONS

The typical ONU 14 provides 10 card slots, each of which can be used for telephony or video services. POTS cards 26, hard-wired video cards 30, and switchable video cards 28 can be inserted into any slot. Connection of a primary subscriber 20 to video services may be provided through the use of a connection board 34, as show in FIG. 1, to either the switch matrix card 24 or the hard-wired video cards 30 located in the ONU 14. The connection board 34 of FIG. 4 is shown wired for telephony services only since the primary subscribers 20 (labeled 1–16) are connected through the switch matrix card 24, and crosspoints 38 of the switch matrix card 24 are in a default state (i.e., not connected to video ports 36). Adding video services, up to a limit of video ports 36 provided by the switch matrix card 24, leaves the connection board 34 exactly as shown in FIG. 4. Primary subscribers 20 initially supplied with telephony services only can be remotely provided with video services at a later date via the use of the switch matrix card 24, assuming that switchable video cards 28 are resident in the ONU 14 and the resources of these switchable video cards 28 have not been exhausted on the switch matrix card 24. The addition of video services up to a maximum number of video ports 36 dedicated to the switch matrix card 24 does not require the dispatch of service personnel and the connection board 34 remains the same as shown in FIG. 4.

For the example, in an effort to minimize cost, the switch matrix card 24 is designed with the following assumptions:

1. video services can be provided to the first 16 primary subscribers 20;
2. the switch matrix card 24 can be omitted (i.e., all video services and telephony services are hard-wired), or provided with 1 or more video ports 36, based upon projections of video service "take" rates.

The switch matrix card 24 is capable of accommodating new requests for video services immediately via a command from the remote terminal 18. Once the video ports 36 connected to the switch matrix card 24 are exhausted, service personnel must be dispatched in order to hard-wire video services to new subscribers previously supplied by the switchable video cards 28 from the video ports 36 via the switch matrix card 24, and restore the video ports 36 accessible by the switch matrix card 24 for use by future primary subscribers 20. Video services can also be permanently provided by the switch matrix card 24 in the event such resources are not expected to be required by other primary subscribers 20. If the switch matrix card 24 is required elsewhere each of the primary subscribers 20 currently receiving video services through the switch matrix card 24 could be hard-wired via the connection board 34 enabling the switch matrix card 24 to be removed entirely.

It is also possible to avoid the dispatch of service personnel in a case where a video card goes bad. In that case, the present invention provides the capability of remote repair for removing a "dead" video card and replacing it with a new one without dispatching craft to the ONU. It can do this simply by substituting one of the spare switchable video cards for the "dead" card remotely.

The switch matrix card 24 will supply video to any of the primary subscribers 20. When all the switchable video cards 28 connected to the switch matrix card 24 have been remotely allocated to primary subscribers 20 and the video service capability of the switch matrix card 24 is exhausted, such capability may be restored by connecting the hard-wired video cards 30 via the connection board 34 as shown in FIG. 5, a removal of the primary subscriber 20 in question from the switch matrix card 24 also shown in FIG. 5, a reset of the switch matrix card 24 and a power-up of the hard-wired video cards 30 just connected.

For example, assume that the connection board 34 is wired as shown in Fig.4 where the first 16 primary subscribers 20 are provided video services via the switch matrix card 24. A layout of the switch matrix card 24 being 2×16 (where 2 is a number of video ports 36 and 16 is a number of telephony ports) provides telephony services to 16 primary subscribers 20, while having access to 2 video ports 36.

When telephony only primary subscriber #4 40 requests video services to be added primary subscriber #4 40 is provisioned remotely and given video services immediately through the switch matrix card 24, with no hard-wiring required. Likewise, telephony services only primary subscriber #3 42 can be remotely assigned to a second video port 36 of the switch matrix card 24. However, upon a third primary subscriber 20 requesting video services (in a 2×16 switch card matrix), primary subscriber #4 40 (or primary subscriber #3 42) would be hard-wired via jumpers 44 to a new hard-wired video card 30, as shown in FIG. 5. Providing primary subscriber #4 40 with video services via a hard-wired video card 30 frees one of the two video ports 36 to the switch matrix card 24 in order to offer video services to the third primary subscriber 20 requesting video service. The third primary subscriber 20 could be hard-wired as well although this is not shown on FIG. 5. obviously a 4×16 switch matrix card 24 or similar configuration would merely be an extension of the above discussion.

Due to the difficulty of providing video and telephony services capability while withstanding the effects of lightning/power cross and other physical constraints, the switch matrix card 24 is not typically able to provide more than 4 video ports 36 and 16 telephony ports in order to guarantee meeting Bellcore requirements. An 8×16 matrix on one switch matrix card 24, even when component real estate limitations are disregarded, is considered to be too risky from a lightning/power cross standpoint.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Apparatus for distribution of video and telephony (POTS) services on a single twisted wire pair to each of a plurality of subscribers, comprising an optical network unit (ONU) connected by means of an optical fiber to a remote terminal, said ONU for installation in a neighborhood of subscribers, characterized in that said ONU comprises:

a plurality of POTS cards;

a switch matrix card connected to the POTS cards for providing said POTS services to primary subscribers over corresponding twisted wire pairs for primary subscribers; and a plurality of switchable video cards connected to said switch matrix card for connecting one or more of said switchable video cards to corresponding POTS cards resulting in an overlay on a corresponding one or more of said twisted wire pairs for primary subscribers of said video services and said telephony services selected remotely over said fiber from said remote terminal.

2. The apparatus of claim 1, characterized in that said ONU further comprises, dedicated video cards for connection to secondary subscribers via corresponding twisted wire pairs for secondary subscribers for providing video and telephony services.

3. The apparatus of claim 2, characterized in that said ONU is installed with a connection board outside said ONU to which said corresponding twisted wire pairs for primary subscribers are connected and to which said corresponding twisted wire pairs for secondary subscribers are connected in order to provide service access outside said ONU.

4. The apparatus of claim 3, characterized by said connection board connected to said corresponding twisted wire pairs for secondary subscribers, for providing said secondary subscribers with both video services from said dedicated video cards and telephony services from said POTS cards.

5. The apparatus of claim 4, further characterized by said ONU including hard-wired video cards, said connection board connected to said hard-wired video cards for enabling a change in connection of one or more of said twisted wire pairs for primary subscribers from a corresponding one or more of said switchable video cards to a corresponding one or more of said hard-wired video cards for providing POTS and video services to one or more corresponding primary subscribers for enabling connection of said one or more switchable video cards to one or more corresponding twisted wire pairs for other primary subscribers.

6. The apparatus of claim 1, characterized in that said switch matrix card is comprised of a plurality of relays interconnected to allow any POTS card to be connected with any switchable video card, whereby video services are overlaid on said telephony services.

* * * * *

UNITED STATES PATENT AND TRADEMARK OFFICE
CERTIFICATE OF CORRECTION

PATENT NO. : 5,903,372
DATED : May 11, 1999
INVENTOR(S) : R. Czerwiec

It is certified that error appears in the above-identified patent and that said Letters Patent is hereby corrected as shown below:

On the title page:
    Item [73] , lines 1 and 2, please cancel "Alcatel Network Systems, Inc. Richardson, Tex." and substitute --Alcatel Alsthom Compagnie Generale d'Electricite, Paris, France-- therefor.

Signed and Sealed this

Twenty-eighth Day of December, 1999

Q. TODD DICKINSON

Attest:

Attesting Officer

Acting Commissioner of Patents and Trademarks